United States Patent
Parasuram et al.

(10) Patent No.: US 9,864,802 B2
(45) Date of Patent: Jan. 9, 2018

(54) RULES-BASED KNOWLEDGE-DRIVEN SEARCH FILTERS

(71) Applicants: Arvind Parasuram, Arlington, TX (US); Javeed Nizami, Plano, TX (US)

(72) Inventors: Arvind Parasuram, Arlington, TX (US); Javeed Nizami, Plano, TX (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 684 days.

(21) Appl. No.: 14/034,063

(22) Filed: Sep. 23, 2013

(65) Prior Publication Data

US 2014/0358893 A1    Dec. 4, 2014

Related U.S. Application Data

(60) Provisional application No. 61/828,342, filed on May 29, 2013, provisional application No. 61/828,339, filed on May 29, 2013.

(51) Int. Cl.
*G06F 17/30* (2006.01)

(52) U.S. Cl.
CPC .. *G06F 17/30864* (2013.01); *G06F 17/30292* (2013.01); *G06F 17/30336* (2013.01); *G06F 17/30392* (2013.01)

(58) Field of Classification Search
USPC ................................................ 707/706, 711
See application file for complete search history.

(56) References Cited

U.S. PATENT DOCUMENTS

| | | | | |
|---|---|---|---|---|
| 7,703,040 | B2 * | 4/2010 | Cutrell | G06F 17/30979 707/E17.014 |
| 7,787,672 | B2 * | 8/2010 | Reicher | G06F 19/321 382/128 |
| 7,788,270 | B2 * | 8/2010 | Bernard | G06F 17/30867 707/706 |
| 7,856,434 | B2 * | 12/2010 | Gluzman Peregrine | G06F 17/30991 707/722 |
| 7,966,309 | B2 * | 6/2011 | Shacham | G06F 17/30696 707/708 |
| 8,069,162 | B1 * | 11/2011 | Emigh | G06F 17/30707 707/706 |
| 8,108,380 | B2 * | 1/2012 | Fothergill | G06F 17/30722 707/708 |
| 8,250,096 | B2 * | 8/2012 | Su | G06F 17/30867 705/35 |
| 8,407,197 | B2 * | 3/2013 | Zasman | G06F 17/30011 707/705 |

* cited by examiner

*Primary Examiner* — Kim Nguyen

(57) ABSTRACT

Methods for product data management and corresponding systems and computer-readable mediums. A method for rules-based knowledge-driven search filters includes receiving metadata for a plurality of searchable objects, the metadata including at least one of an object type definition and object properties. The method includes defining search filter rules based on user properties and data conditions. The method includes performing a search according to a rule-based configuration, the rule-based configuration including filters for object properties and filter ordering rules. The method includes displaying search results according to the rule-based configuration.

20 Claims, 3 Drawing Sheets

RULES-BASED KNOWLEDGE-DRIVEN SEARCH FILTERS

CROSS-REFERENCE TO RELATED APPLICATIONS

This application claims the benefit of the filing date of U.S. Provisional Patent Applications 61/828,342 and 61/828,339, both filed May 29, 2013, which are hereby incorporated by reference. This application also has some subject matter in common with concurrently filed U.S. patent application Ser. No. 14/033,959 for "Single-Point Metadata Driven Search Configuration, Indexing, and Execution," which is hereby incorporated by reference.

TECHNICAL FIELD

The present disclosure is directed, in general, to computer-aided design, visualization, and manufacturing systems, product lifecycle management ("PLM") systems, and similar systems, that manage data for products and other items (collectively, "Product Data Management" systems or PDM systems).

BACKGROUND OF THE DISCLOSURE

PDM systems manage PLM and other data. Improved systems are desirable.

SUMMARY OF THE DISCLOSURE

Various disclosed embodiments include systems and methods for rules-based knowledge-driven search filters. A method for rules-based knowledge-driven search filters includes receiving metadata for a plurality of searchable objects, the metadata including at least one of an object type definition and object properties. The method includes defining search filter rules based on user properties and data conditions. The method includes performing a search according to a rule-based configuration, the rule-based configuration including filters for object properties and filter ordering rules. The method includes displaying search results according to the rule-based configuration.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software, or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
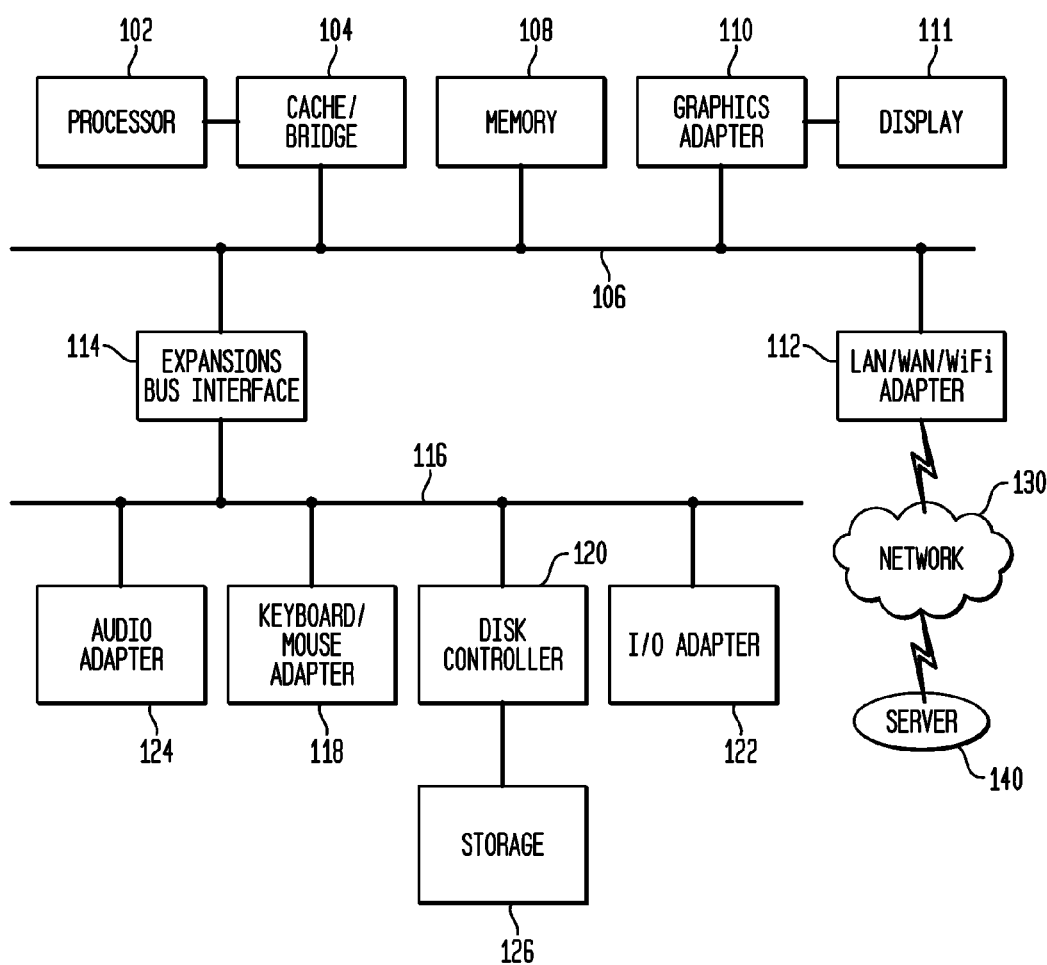
FIG. 1 depicts a block diagram of a data processing system in which an embodiment can be implemented.
Figure 2:
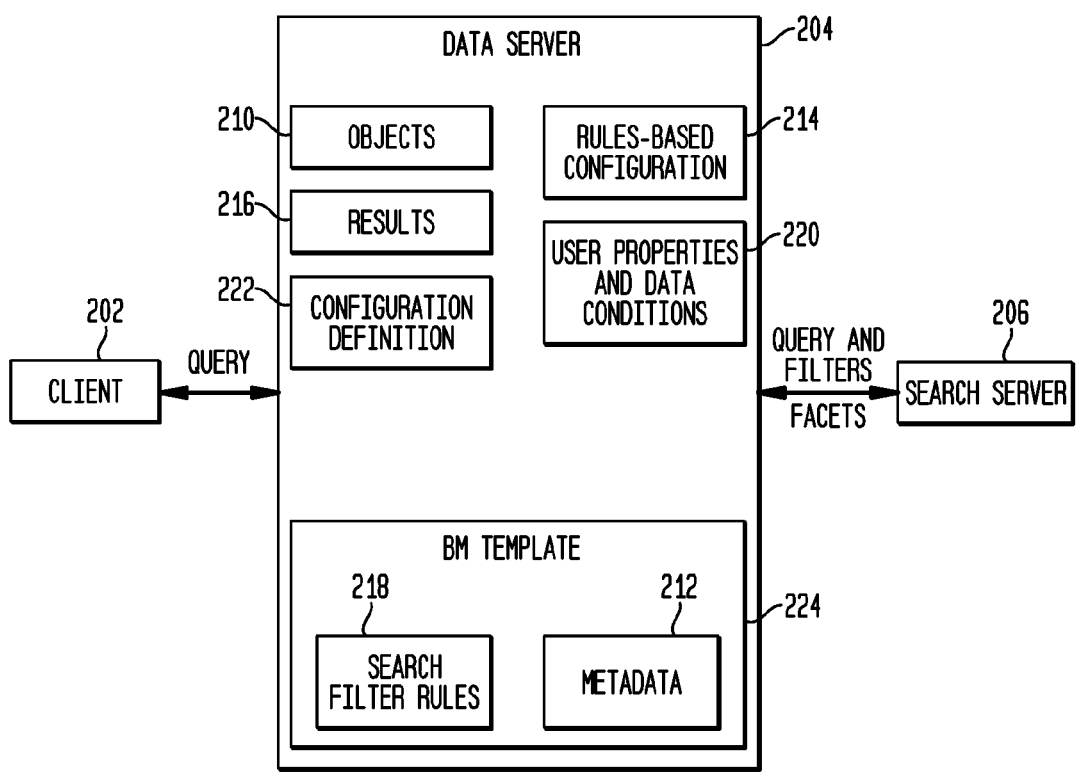
FIG. 2 illustrates an exemplary query execution process in accordance with disclosed embodiments.
Figure 3:
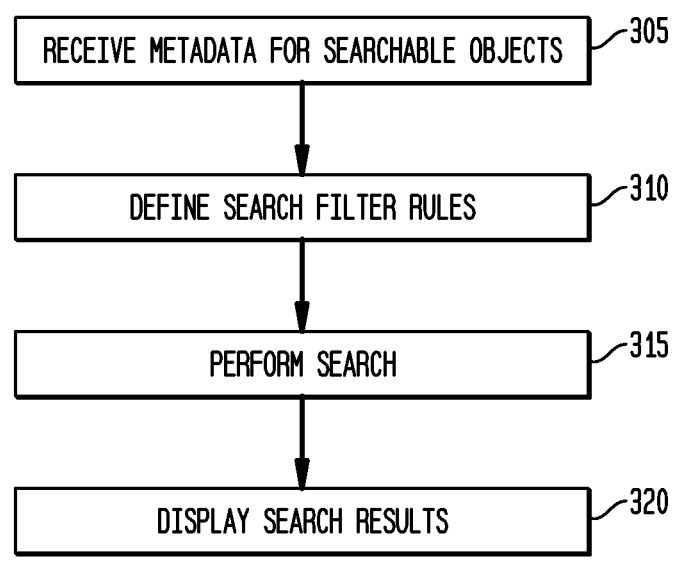
FIG. 3 illustrates a flowchart of a process in accordance with disclosed embodiments that can be performed by one or more data processing systems.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Efficient search is increasingly an integral part of any data management application or a web site. For examples, websites such as those run by Amazon and eBay are built around a search capability. One of the key components of providing an effective search solution is to allow users to filter the data based on search filters the application offers. The filters that are offered tend to be driven by the knowledge of what data is being searched and the user context.

Some systems can provide the user the capability to filter the search results, and the filters change based on the data and user context, but these solutions tend to require coding to change the filters that are offered to the end user. This could end up limiting how end users can sift through search results and thereby potentially miss viewing data that could be relevant because the business cannot change the filters as they understand the user community better or the data changes. For commercial web sites that leverage search technology, this could mean lost revenue, and for PLM systems, this could lead to costly mistakes because the user could not find the relevant information as they are overwhelmed with unrelated data.

The shortcomings with this approach are that it does not effectively address the changing needs of the end user. It requires the customer to wait till a new version of the application is deployed, which typically could be delayed in a large production environment, or it requires the customer to engage a third party to develop a customized version of the search component every time they need something changed, which could result in a dissatisfied end-user or customer.

Disclosed embodiments include systems and methods where the filters that are offered to the end user are configurable based on the knowledge that the business is accumulating over time or that the data conditions update without requiring a user or administrator to write code and redeploy the solution.

Disclosed embodiments overcome restrictive and predetermined search filters by enabling the end user to control what is relevant to them in a manner that is intuitive and user friendly.

Typically, when data is indexed for searching in a PDM or commercial environment, it is usually product-related data that is indexed and end users are interested in searching and filtering based on certain properties in the product data. Disclosed embodiments allow end users to define a set of search filter rules based on what is relevant to them, so as to focus on only relevant results and thereby improve productivity. These rules then control what filters are shown to any given user and the precedence; for example, filters that may be relevant to a particular group of users in an organization or particular roles users play in an organization.

For example, designers may be interested in filtering search results based on the type of part and the modification dates of the part, in that order, whereas an engineer may be interested in filtering search results based on the type of part and the cost of the part, in that order. Accordingly, there are two end users of the same application looking at the same search results with different filters. The business and domain knowledge allows the administrator or the end user to specify rules that control what filters are shown and in what order. They have the control to choose what they want to see and change it, if necessary, without having to request an enhancement to the search component.

One significant advantage of the disclosed rules-based approach is that no code must be written by the user or operator to configure search filters when there is a change to the requirements or as knowledge about what is more relevant evolves through learning. The entire configurability of search filters rests in the hands of the application administrator and end user. Further, the configuration definition can be persisted and automated to automatically index search data with this information across multiple search engines, following a "define once, deploy everywhere" model. This is a huge productivity improvement and savings for the customer.

FIG. 1 illustrates a block diagram of a data processing system in which an embodiment can be implemented, for example as a PDM system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Some systems implement a "one-size-fits-all" code-based solution to searching with limited configurability and tailored towards a specific business need or industry. When the business requirements change, either the original code has to be modified or customized to align with the new business requirements. This can increase the cost to keep current with business requirements and deployment time for the customer.

Even in cases where there might be limited configuration capabilities provided, such systems may not be capable of effectively addressing the changing needs of the end user or business based on the data conditions and context.

Disclosed embodiments enable filters to be offered to the user of an application based on business knowledge, data conditions, and user context. Rules are defined without requiring code changes that then allow the system to offer the right filters based on the rules that are in affect at that time. These rules can be changed over time, and as the rules change, the filters that are offered to the user will change.

For example, rules can be defined to offer filters for object status when the based on a user role or user profile, such as when the user is a program manager, a designer, an engineer, or even a consumer using a commercial website to shop. On a commercial site like Amazon, a user searching for televisions may have historically shown a preference, as recorded in a user profile, towards lower cost items that are highly ranked by others. For this user profile, rules can be defined to offer cost ranges and user rankings as the top two filters. Another user may be more driven by well-known brand names and for that user profile, rules can be defined that offer brands as the top filter.

In the Teamcenter® software products by Siemens Product Lifecycle Management Software Inc., the data model is defined using the Business Modeler Integrated Development Environment (BMIDE). The metadata, which can include the object type definition and properties, is stored in BMIDE templates, including any other information that can be described by a corresponding metadata definition. Other systems use other specific approaches, and disclosed techniques can be used to create and manage metadata and metadata definitions as described herein as adapted for those systems. For consistent reference, these will be referred to as a business modeler (BM) and BM templates and are not intended to specifically refer to the Siemens Product Lifecycle Management Software Inc. software in particular.

To implement the rule-based, knowledge-driven search filters, the system, such as BM, is used to define the search filter rules based on user properties, data conditions etc. The system can do so automatically or can do so via an interaction with a user. When users search for data in a product such as the Teamcenter Active Workspace Client or using another client system, they can sift through the search results using the filters that are provided. These filters are used to filter data based on properties on the business objects that are indexed in the search engine. The specific filters that are shown and the order in which they are shown, i.e., the priority, can be configured by the administrator using the BM.

To implement part of the above rule based configuration capability, BM property constants can be used to determine which business objects can be indexed in the search engine, which business object properties the user can use to search, which business object properties the user can use to filter the search results, and the order in which the filters can show up in the client. For example, one customer may prefer that the object type should show up at the top of the filter list while another customer may want the users who last modified the objects to show up at the top of the filter list. In addition, the order of the filters can be configured per business object type, e.g., the order in which filters are displayed on parts can be different than the order in which they are displayed on documents.

The above configuration is persisted in BM templates and allows the customer to override the configuration that is provided out-of-the-box. Depending on the search engine being used to index the product data, the generation of this configuration definition specific to each search engine from the BM data model is automated during a BM template update process, thereby eliminating any need to manually redefine it for every deployment.

In addition, the metadata definition can be leveraged during search execution to construct the search queries and filters to send to the search engine and to define facets to send back to the client to be able to provide filtering capability. The metadata definition can define the metadata that can be used to identify and search the corresponding objects, and can include object type definitions and properties, the properties, data, or other information based on which queries can be made, filtered, or aggregated as result facets, and other information.

FIG. 2 illustrates an exemplary query execution process in accordance with disclosed embodiments that can be implemented, for example, using Teamcenter® data and the Solr search engine. Solr refers to the Solr open-source search server, but the principles described herein can be applied to other search engines and systems, which are referred to generically as a "search server" below. A data server, as used herein, can be implemented by a Teamcenter® server or other server that performs processes as described. Note that any of the systems described herein can be implemented as a separate data processing system 100, or the functions of multiple systems may be performed by the system physical system.

During query execution, client system 202 sends the query, according to the metadata defined in the BM template 224, to data server 204.

Data server 204 constructs the query in the search server format from the user-provided input, including the metadata definition. This can help eliminate the need for the user to have knowledge about the search server internals. The data server 204 can add any appropriate query filters.

Data server 204 can store any of the data discussed herein, such as objects 210, metadata 212, rules-based configuration 214, results 216 received from the search server, search filter rules 218, user properties and data conditions 220, configuration definition 222, and BM template 224. Some or all of this data can also be stored in the client system 202 or search server 206. Objects 210 can include BM business object constants and property constants.

The data server 204 can send the query and any filters to the search server 206.

Search server 206 executes the query and constructs any appropriate facet information from the metadata or metadata definition to send back to the client, for example by aggregating query result data identified by the object type definition and properties in the metadata definition. Search server 206 sends any results and any facet information back to the data server 204, which can then send it to the client. Facets provide aggregated data based on a search query. Facets correspond to properties of the data being searched, and can be derived by analysis of the text or contents of an item using entity extraction techniques or from pre-existing fields in a database such as author, descriptor, language, and format, or other fields specific to the type of data. Thus, existing web-pages, product descriptions or online collections of articles can be augmented with navigational facets.

These processes illustrate the tremendous value the "code-less" metadata definition provides in the generation of facet information for consumption by the end-user.

Disclosed embodiments enhance this capability by using a rules-based approach to define the search filters based on a specific user or the user's group or role in the organization. This can be implemented by a BM that allows conditional attachment of BM business object constants and property constants to business objects and their properties respectively, which can be stored with objects 210. This can be coupled with a live update capability in BM to provide a powerful mechanism to allow end users to tailor the search filters relevant to their specific needs, without having to wait for an enhancement to the application.

Disclosed embodiments provide the capability for customers to align the search solution to changing business needs, without writing any code. The metadata-based system and rules drive the process to construct the query to send to the search engine and optimize filters offered based on the user's session information and rule-based filters.

The techniques disclosed herein can extend to any application, including shopping sites such as Amazon® and eBay®.

FIG. 3 illustrates a flowchart of a process in accordance with disclosed embodiments that can be performed by one or more data processing systems, referred to generically as the "system" below.

The system receives metadata for a plurality of searchable objects (305). "Receiving," as used herein, can include loading from storage, receiving from another device or process, receiving via an interaction with a user, or otherwise. The searchable objects, such as objects 210 illustrated in FIG. 2, can be business objects, objects representing product components and parts, for example in a PDM system or otherwise. The metadata, such as metadata 210 of FIG. 2, describing objects 210, can include an object type definition that defines the type of the corresponding object, object properties that describe properties of the corresponding object, or other information. The metadata can be received, for example, by a data server system 204 as described herein, including a data server implementing a BM, by a search server 206 as described herein, or otherwise. Of course, these systems can be implemented, in various embodiments, on different hardware systems or on the same hardware system. The metadata can be stored in a BM template such as BM template 224 illustrated in FIG. 2.

As part of 305, the system can also create and maintain property constants, such as stored with objects 210 of FIG. 2, that can define which objects are indexed in a search server and can define which object properties, object type definitions, or other information can be searched.

The system defines search filter rules (310), such as search filter rules 218 in FIG. 2. The search filter rules can be based on user properties, specific users, user roles, user groups, data conditions, user project assignments, or other factors. The search filter rules can be defined via an interaction with a user such as an administrator or other individual.

The system performs a search of the objects according to a rule-based configuration (315). The rule-based configuration can include filters for object properties or filter ordering rules as described herein. This can be performed using a configuration definition specific to the search server or search engine, and the system can define a configuration definition for a specific search server or search engine based on the search filter rules and the rule-based configuration, such as configuration definition 222 of FIG. 2. The system can also maintain a plurality of configuration definitions, each corresponding to a respective specific search engine and based on the search filter rules and the rule-based configuration. The system can also display rule-based configuration options to a user and receive a corresponding selection of the rule-based configuration to be used for the search; in this way, the user can select the filters and filter ordering rules to be used in the search.

The system displays search results according to the rule-based configuration (320). The search results can include any of the objects that match the defined filters for the object properties and can be ordered according to the filter ordering rules.

Disclosed embodiments provide the end user with relevant search results in an optimized and effective manner with minimum effort expended towards configuration.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for rules-based knowledge-driven search filters, the method performed by a data processing system and comprising:
  receiving metadata for a plurality of searchable objects, by the data processing system, the metadata including at least one of an object type definition and object properties;
  defining search filter rules based on user properties and data conditions, by the data processing system;
  performing a search according to a rule-based configuration, by the data processing system, the rule-based configuration including filters for object properties and filter ordering rules, the filter ordering rules specifying the order in which the filters are applied; and
  displaying search results according to the rule-based configuration, by the data processing system.

2. The method of claim 1, wherein the data processing system maintains property constants that define which objects are indexed in a search engine and which object properties can be searched.

3. The method of claim 1, wherein the data processing system defines a configuration definition for a specific search engine based on the search filter rules and the rule-based configuration.

4. The method of claim 1, wherein the search filter rules are also based on specific users, user roles, or user groups.

5. The method of claim 1, wherein the metadata is stored in a business modeler (BM) template.

6. The method of claim 1, wherein the search filter rules are defined via an interaction with a user.

7. The method of claim 1, wherein the data processing system also displays rule-based configuration options to a user and receives a corresponding selection of the rule-based configuration to be used for the search.

8. The method of claim 1, wherein the data processing system maintains a plurality of configuration definitions each corresponding to a respective specific search engine based on the search filter rules and the rule-based configuration.

9. At least one data processing system, comprising:
a processor; and
an accessible memory, the at least one data processing system configured to:
receive metadata for a plurality of searchable objects, the metadata including at least one of an object type definition and object properties;
define search filter rules based on user properties and data conditions;
perform a search according to a rule-based configuration, the rule-based configuration including filters for object properties and filter ordering rules, the filter ordering rules specifying the order in which the filters are applied; and
display search results according to the rule-based configuration.

10. The data processing system of claim 9, wherein the data processing system maintains property constants that define which objects are indexed in a search engine and which object properties can be searched.

11. The data processing system of claim 9, wherein the data processing system defines a configuration definition for a specific search engine based on the search filter rules and the rule-based configuration.

12. The data processing system of claim 9, wherein the search filter rules are also based on specific users, user roles, or user groups.

13. The data processing system of claim 9, wherein the metadata is stored in a business modeler (BM) template.

14. The data processing system of claim 9, wherein the search filter rules are defined via an interaction with a user.

15. The data processing system of claim 9, wherein the data processing system also displays rule-based configuration options to a user and receives a corresponding selection of the rule-based configuration to be used for the search.

16. The data processing system of claim 9, wherein the data processing system maintains a plurality of configuration definitions each corresponding to a respective specific search engine based on the search filter rules and the rule-based configuration.

17. A non-transitory computer-readable medium encoded with executable instructions that, when executed, cause one or more data processing systems to:
receive metadata for a plurality of searchable objects, the metadata including at least one of an object type definition and object properties;
define search filter rules based on user properties and data conditions;
perform a search according to a rule-based configuration, the rule-based configuration including filters for object properties and filter ordering rules, the filter ordering rules specifying the order in which the filters are applied; and
display search results according to the rule-based configuration.

18. The computer-readable medium of claim 17, wherein the data processing system maintains property constants that define which objects are indexed in a search engine and which object properties can be searched.

19. The computer-readable medium of claim 17, wherein the data processing system defines a configuration definition for a specific search engine based on the search filter rules and the rule-based configuration.

20. The computer-readable medium of claim 17, wherein the search filter rules are also based on specific users, user roles, or user groups.

* * * * *